UNITED STATES PATENT OFFICE.

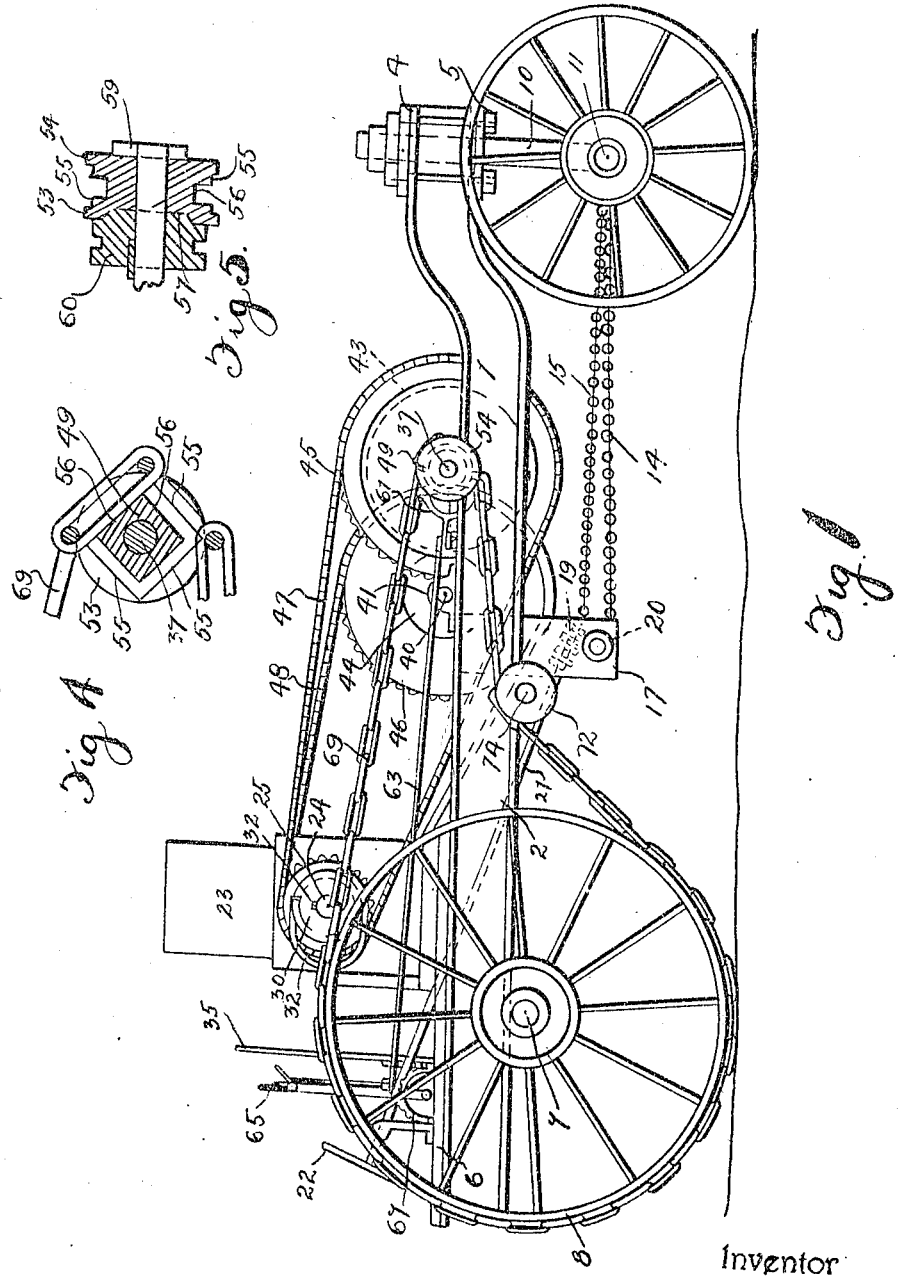

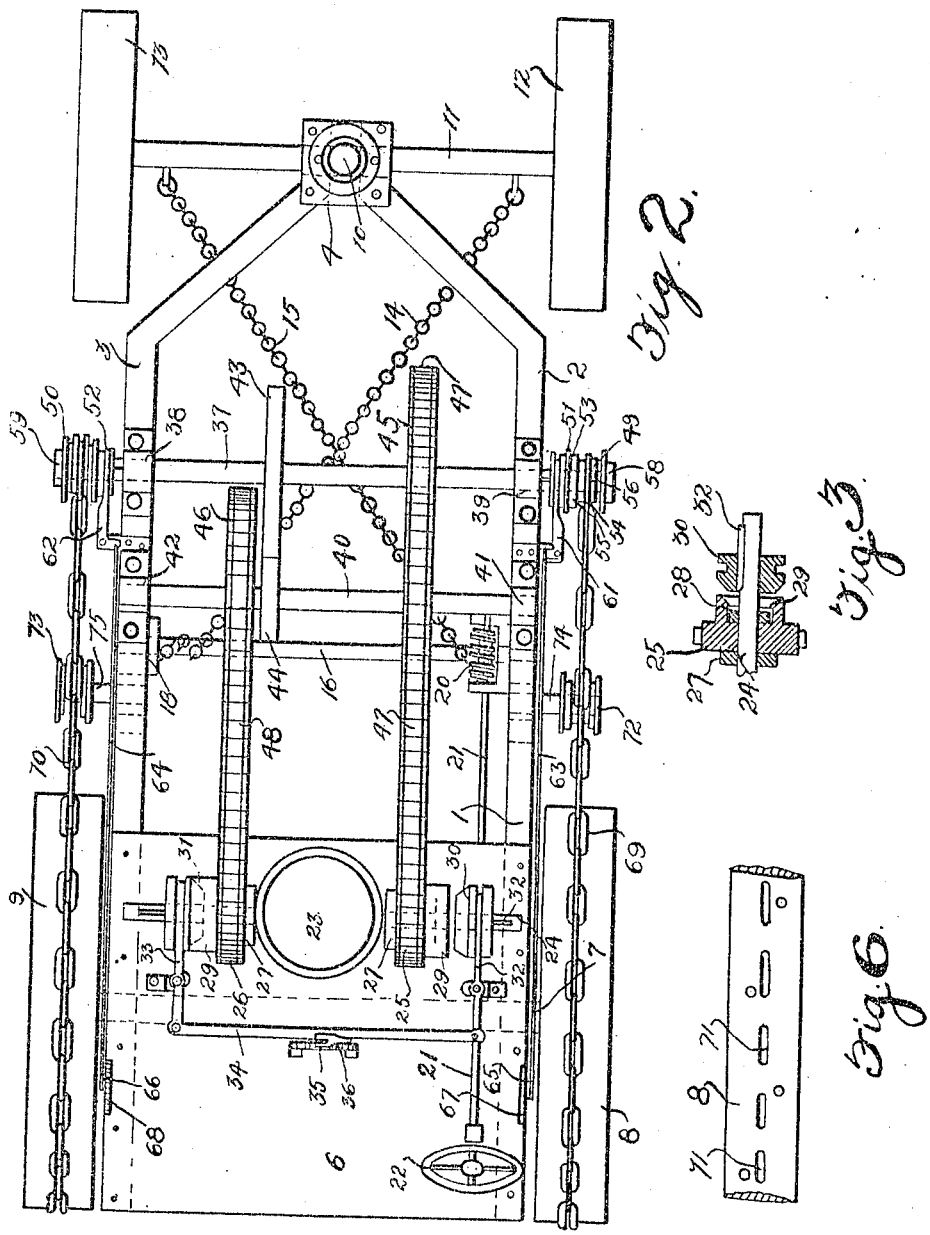

FRANK SPAVEN, OF WINNIPEG, MANITOBA, CANADA.

MOTOR-TRACTOR.

1,292,116.      Specification of Letters Patent.      Patented Jan. 21, 1919.

Application filed May 25, 1917. Serial No. 170,917.

*To all whom it may concern:*

Be it known that I, FRANK SPAVEN, of the city of Winnipeg, in the Province of Manitoba, Canada, have invented certain new and useful Improvements in Motor-Tractors, of which the following is the specification.

The invention relates to improvements in motor tractors and the object of the invention is to provide a comparatively inexpensive, easily assembled and operated tractor and one in which the arrangement of the driving elements is particularly simple and positive while allowing of a forward, reverse and neutral drive. A further object of the invention is to provide a direct driving connection between the main driving shaft and the rims of the rear traction wheels, said connection not only giving a maximum pull on the driving wheels but also insuring of an efficient grip of the rear wheels on the ground.

With the above principal objects in view the invention consists essentially in the arrangement and construction of parts hereinafter more particularly described and later pointed out in the appended claims, reference being had to the accompanying drawings in which:

Figure 1 represents a side view of the complete machine.

Fig. 2 is a plan view thereof.

Fig. 3 is a vertical sectional view through one of the clutch members and adjacent parts.

Fig. 4 is an enlarged detailed vertical sectional view through one of the specially constructed driving pulleys on the main drive shaft.

Fig. 5 is a vertical cross sectional view through one of the latter driving pulleys and adjacent clutch member.

Fig. 6 is a plan view of a fragmentary portion of the rim of one of the rear traction wheeels.

In the drawings like characters of reference indicate corresponding parts in each figure.

1 represents the main frame of a tractor which is formed from a pair of side beams 2 and 3 which have their forward ends converged together and bent slightly upwardly and connected by top and bottom plates 4 and 5 and their rear ends supporting a platform 6 which is permanently secured to the beams.

The rear end of the frame is mounted on a cross axle 7 on the ends of which I mount the rear traction wheels 8 and 9.

The forward end of the frame is mounted on a central pivot post 10 extending centrally upwardly from cross axle 11 on the ends of which I have mounted carriage wheels 12 and 13. The front axle is arranged so that it can be steered by the attendant from the platform, the steering gear comprising a pair of crossed chains 14 and 15 connected forwardly to the outer ends of the axle and having their rear ends wound and attached to a winding shaft 16 carried by a pair of hangers 17 and 18 secured to the beams 2 and 3. On the winding shaft I provide a worm wheel 19 which meshes with a worm 20 located on the lower end of the steering post 21, which post extends through the platform and has the rear end supplied with a hand wheel 22.

23 represents a prime mover, such as an internal combustion engine, permanently mounted on the platform and 24 represents the engine shaft. On the opposite ends of the engine shaft I locate a pair of free chain wheels 25 and 26, which chain wheels are restricted against end play on the shaft by means of inserted collars 27 and 28 fixed to the shaft. Each chain wheel is formed with an extending portion providing a female friction clutch member 29 and directly opposite the female clutch members and on the engine shaft I mount male friction clutch members 30 and 31 which are feathered on the shaft as indicated at 32, this arrangement being such that when the male clutch members are thrown in to engage with the female clutch members the female clutch members will be rotated with the shaft. The male clutch members are directly under the control of a pair of pivoted spanner levers 32 and 33 suitably mounted on the platform, which levers have their rear ends connected by a connection bar 34 so that they are compelled to move simultaneously. The connecting bar is directly under the control of a controlling lever 35 pivotally mounted on the platform and provided with the usual quadrant 36.

From the above arrangement it will be obvious that if one turns the lever 35 in one direction sufficiently he will engage one of the clutch members and disengage the other, and further, he can, by swinging the lever a set amount, disengage both the clutch members, that is, bring them to neutral positions.

37 is a main driving shaft mounted in suitable bearings 38 and 39 carried by the main frame and 40 is a counter shaft located to the rear of the main shaft and carried also in bearings 41 and 42 secured to the main frame.

43 and 44 represent engaging friction wheels secured to the shafts 37 and 40 respectively.

45 and 46 are chain wheels mounted on the main and counter shafts, which chain wheels are connected by means of endless driving chains 47 and 48 with the chain wheels 25 and 26 hereinbefore referred to.

On the ends of the shaft 37, which will be noticed projects beyond the main frame, I have mounted specially constructed driving pulleys 49 and 50 adjoining which I have located friction clutches 51 and 52. As the driving pulleys and adjacent clutch members are both of the same construction I will only describe one of them, and refer particularly to Figs. 4 and 5 of the drawings, where the details are shown.

Each pulley is supplied with a pair of side flanges 53 and 54 between which the body portion is formed, in the present instance to present a square cross section which provides four flat bearing surfaces 55, each of which surfaces is fitted with a lengthwise extending groove 56, the grooves being continuous around the pulley and located centrally thereof. The object of this structure will be later apparent. Each pulley is supplied also with an extending portion forming a female friction clutch member 57 and the pulley is prevented from end movement on the shaft by applied collars 58 and 59. Directly opposite the female clutch member of the pulley I have located a male friction clutch member 60 which is feathered on the drive shaft as indicated, the arrangement being such that when the clutch members are engaged, with the driving shaft rotating, the male clutch members will drive the female clutch members.

The male clutch members of the clutches 51 and 52 are controlled by pivoted spanner levers 61 and 62 to which I attach operating rods 63 and 64 which have their rear ends connected to controlling levers 65 and 66 pivotally mounted on the platform and supplied with the usual hand latches and detents operating on the quadrant 67 and 68.

69 and 70 are similar flat link, endless chains passing around the driving pulleys and around the traction wheels. The traction wheels have the rims slotted as shown at 71, the slots being spaced apart to receive the alternate links of the chains which it will be noticed take a position at right angles to the rim of the wheel with the undersides of the links in the slots, the intermediate links lying flat on the face of the rim. The special construction of the driving pulleys provides also for the links, as it will be observed in referring to Fig. 4 that the flat bearing faces 55 of the pulleys carry the flat lying link of the chain as the pulley turns while the grooves 56 receive the inner sides of the upstanding links that is, the one connecting the flat lying links.

The chains when applied on the wheels are somewhat slack but the slackness is taken up by carrying pulleys 72 and 73 rotatably mounted on short stub shafts 74 and 75 secured to the frame. The carrying pulleys are provided with grooves to allow of the free and easy passage of the chains over them.

From the above disclosure it will be obvious that the chains are driven by the driving pulleys and pull directly on the rims of the traction wheels both in going ahead and backing up and that they embed themselves in the ground and form a specially good tread for the wheels to insure a positive grip. The arrangement gives me a specially efficient drive, owing to the large arm at which the chain is pulling, the arm being practically equal to the radius of the wheel.

In operating the machine the steering is accomplished by manipulating the hand wheel as desired. If one wishes to advance, the lever 36 is drawn to the left to engage the right hand clutch members on the engine shaft and disengage the left hand clutch members. This effects the driving of the drive shaft 37 through the chain 47, and with the clutches 51 and 52, in the forward driving of the traction wheels. At this time it will be obvious that the friction wheel will be driving the chain 48 through the friction pulley 44, but owing to the rear clutches being connected through the bar 34 the chain wheel 26 will be rotating freely on the engine shaft. If one wishes to back up, the lever 36 is swung to the right to engage the left hand clutch members on the engine shaft and disengage the right hand ones. With the clutches in such positions the chain wheel 43 is operating to drive the drive shaft through the friction wheels 44 and 43 and in a direction such that the chains operate to back up the friction wheels. The neutral or standing still position of the machine is effected by turing the lever 36 to a position such that neither one of the engine shaft clutch members are engaged, in which case neither of the chain wheels 47 and 48 is operated.

In turning one manipulates one or the other of the levers 65 and 66 to disengage the clutch members controlled by that lever, the particular lever which is manipulated depending on the direction of the turn. In other words, if one is turning to the left the lever 66 is turned to disengage the clutch member 52 while if he turns to the right he manipulates the lever 65 to disengage the clutch member 51.

What I claim as my invention is:—

In a motor tractor, the combination with a frame, steering wheels supporting the front end of the frame and rear traction wheels supporting the rear of the frame, of an engine mounted on the frame and provided with the usual engine shaft, a main driving shaft rotatably mounted on the front portion of the frame and crossing the same, a counter shaft mounted on the frame adjoining and parallel with the driving shaft, a throw-out driving connection between the engine shaft and the counter shaft, a throw-out driving connection between the engine shaft and the driving shaft, engaging friction pulleys mounted on the counter and driving shafts and independently disengageable driving connections between the ends of the main driving shaft and the rims of the traction wheels.

FRANK SPAVEN.

Witnesses:
 GERTRUDE NICHOLSON,
 LAURA BOWRON.